Oct. 20, 1953 G. E. HUBE 2,655,688
APPARATUS FOR SEPARATING THE FLESH
FROM THE SKIN OF FISH
Filed Aug. 19, 1947 5 Sheets-Sheet 3
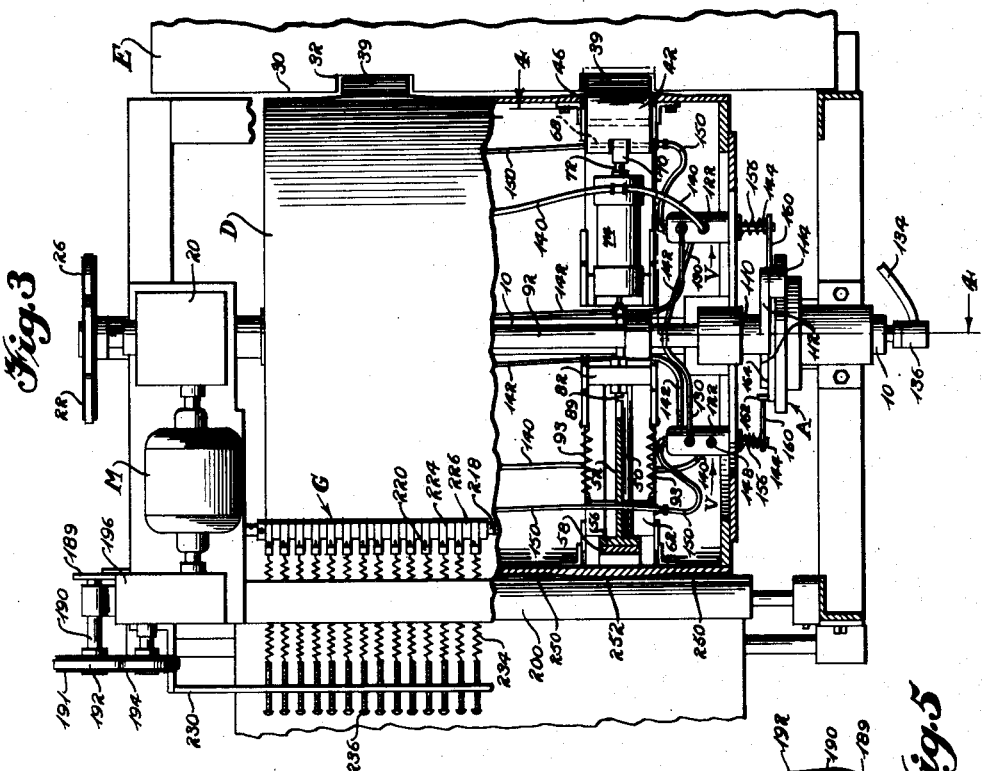
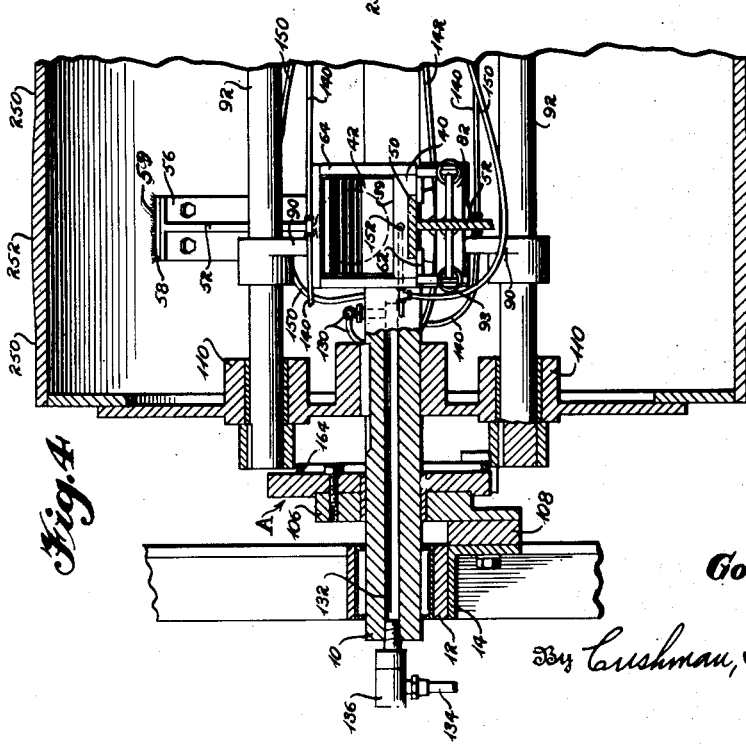
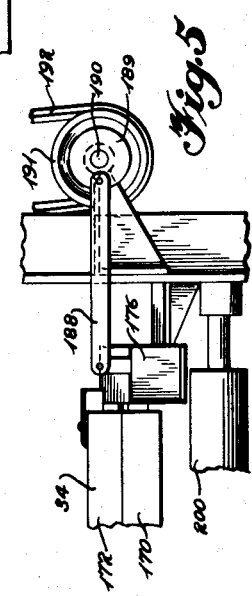
Inventor
Gottfried E. Hube
By Cushman, Darby & Cushman
Attorneys

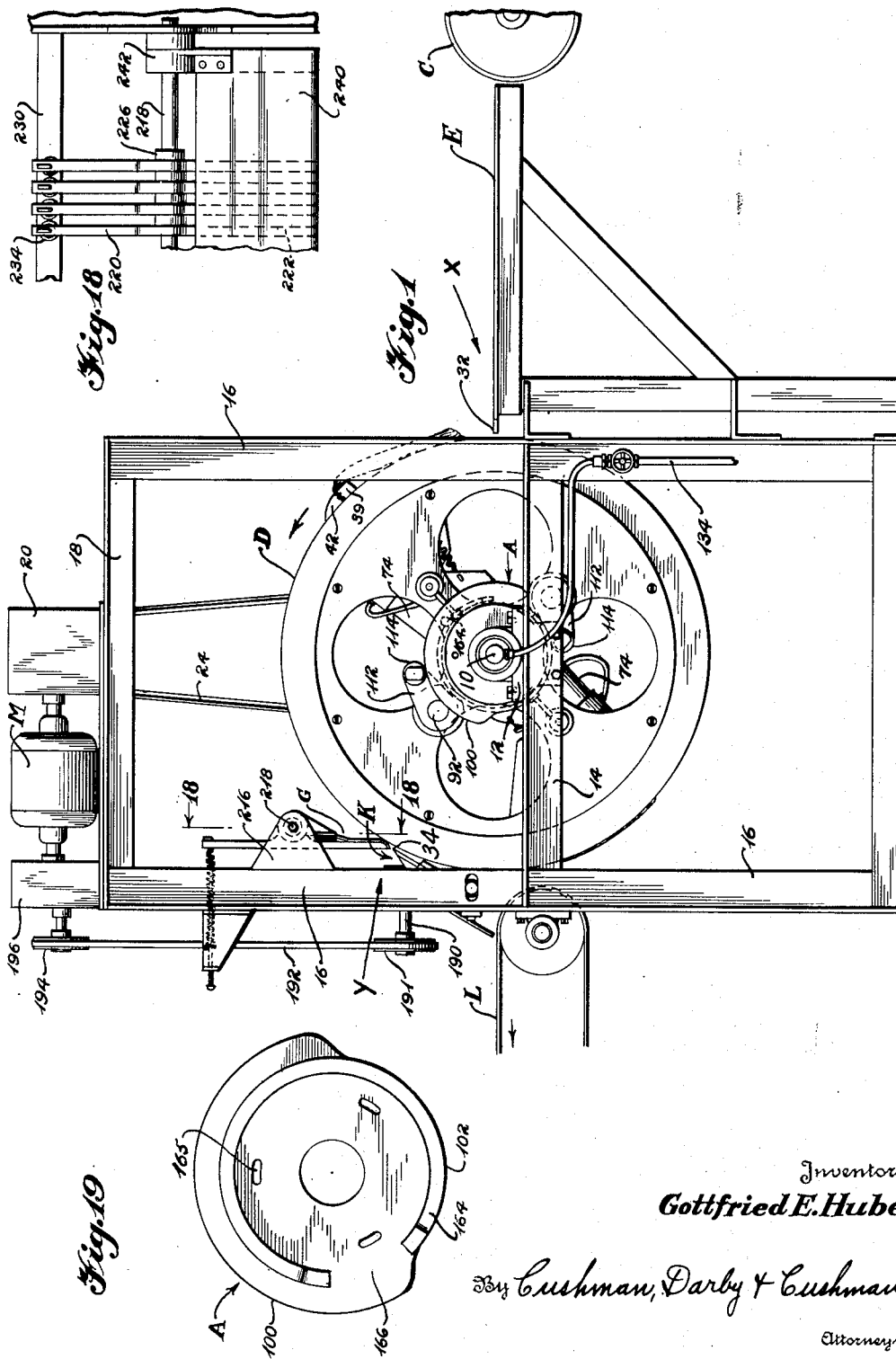

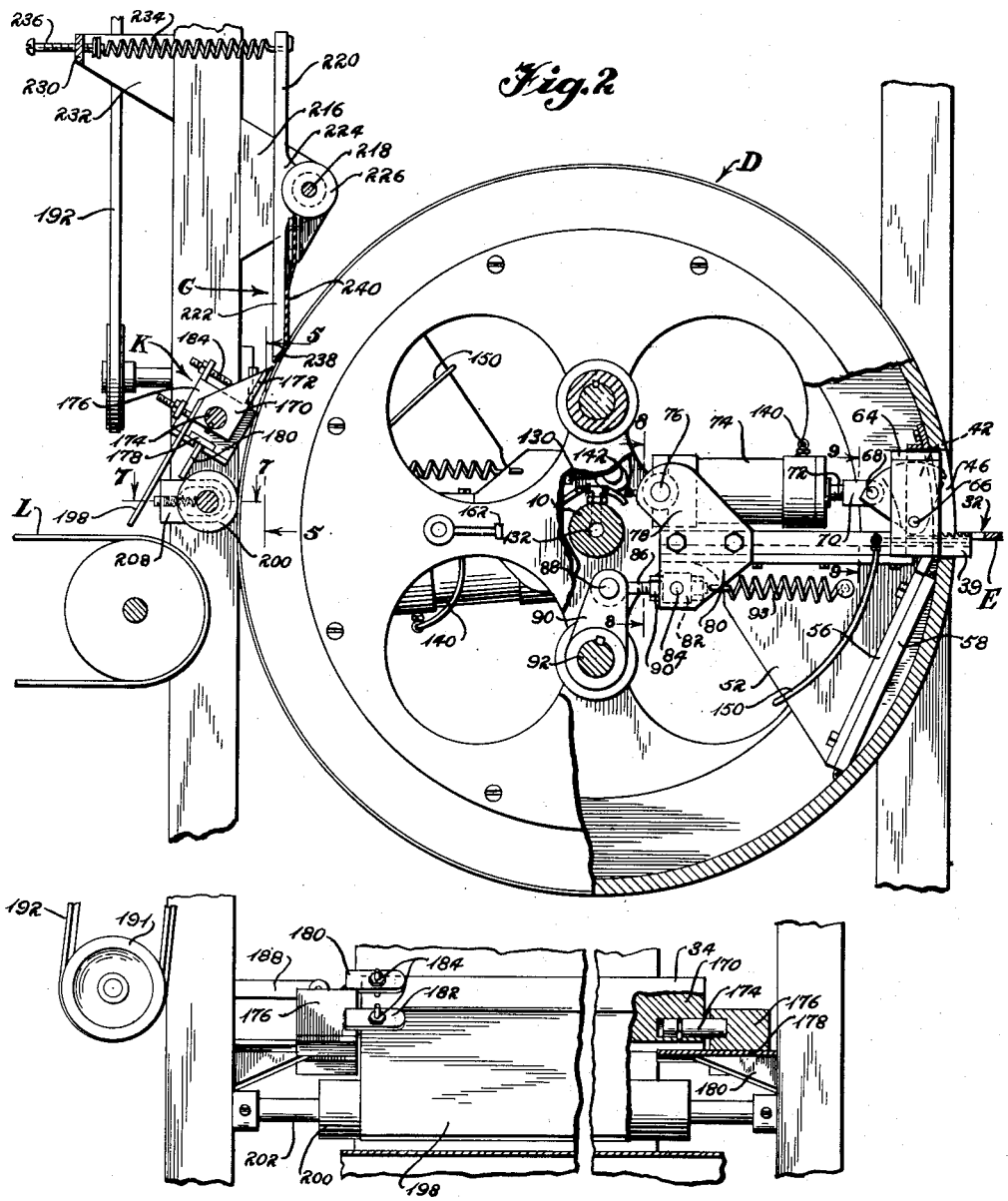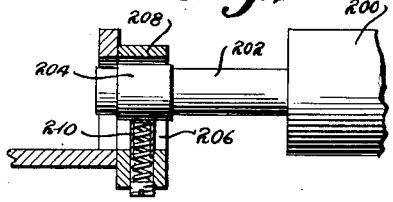

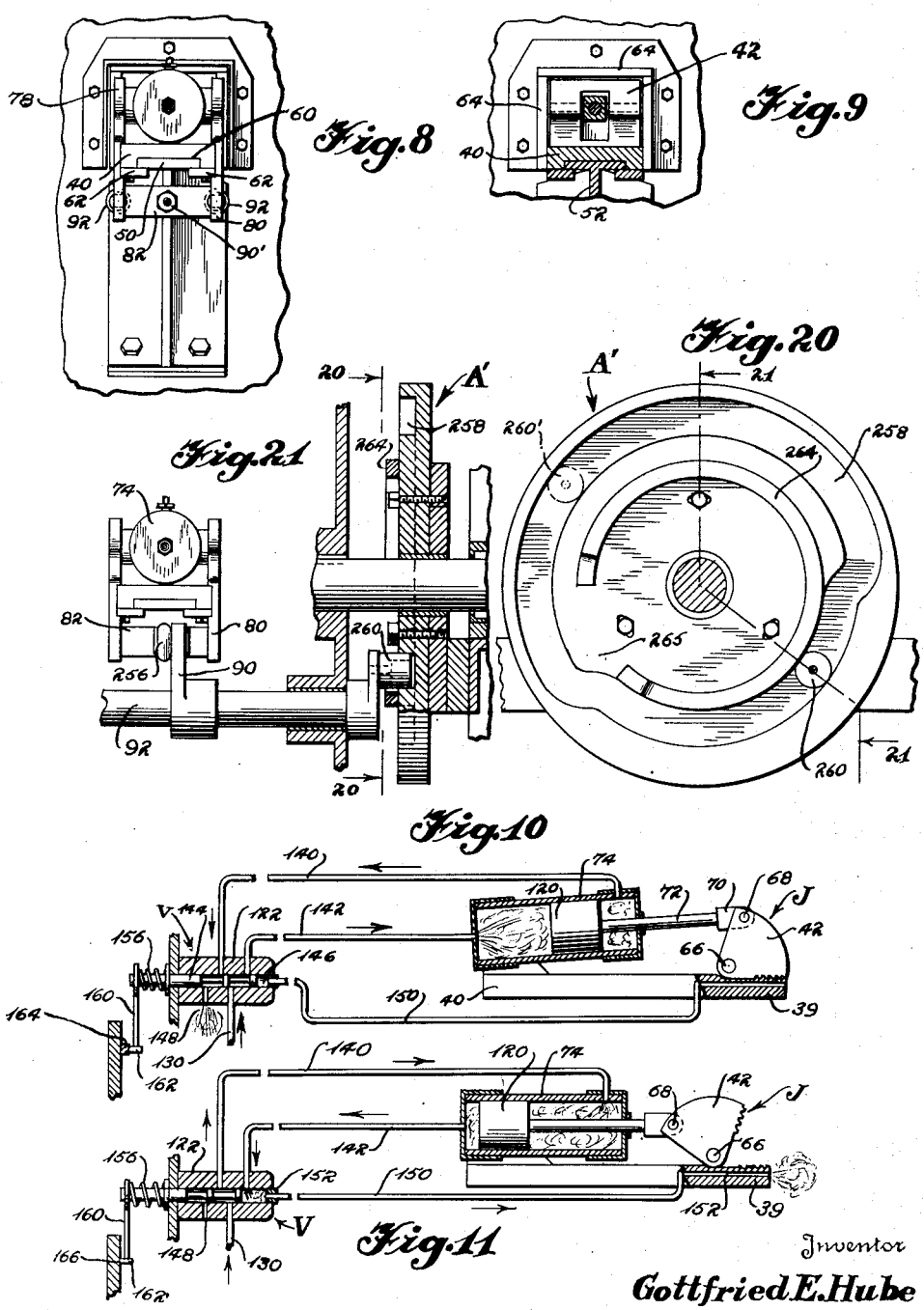

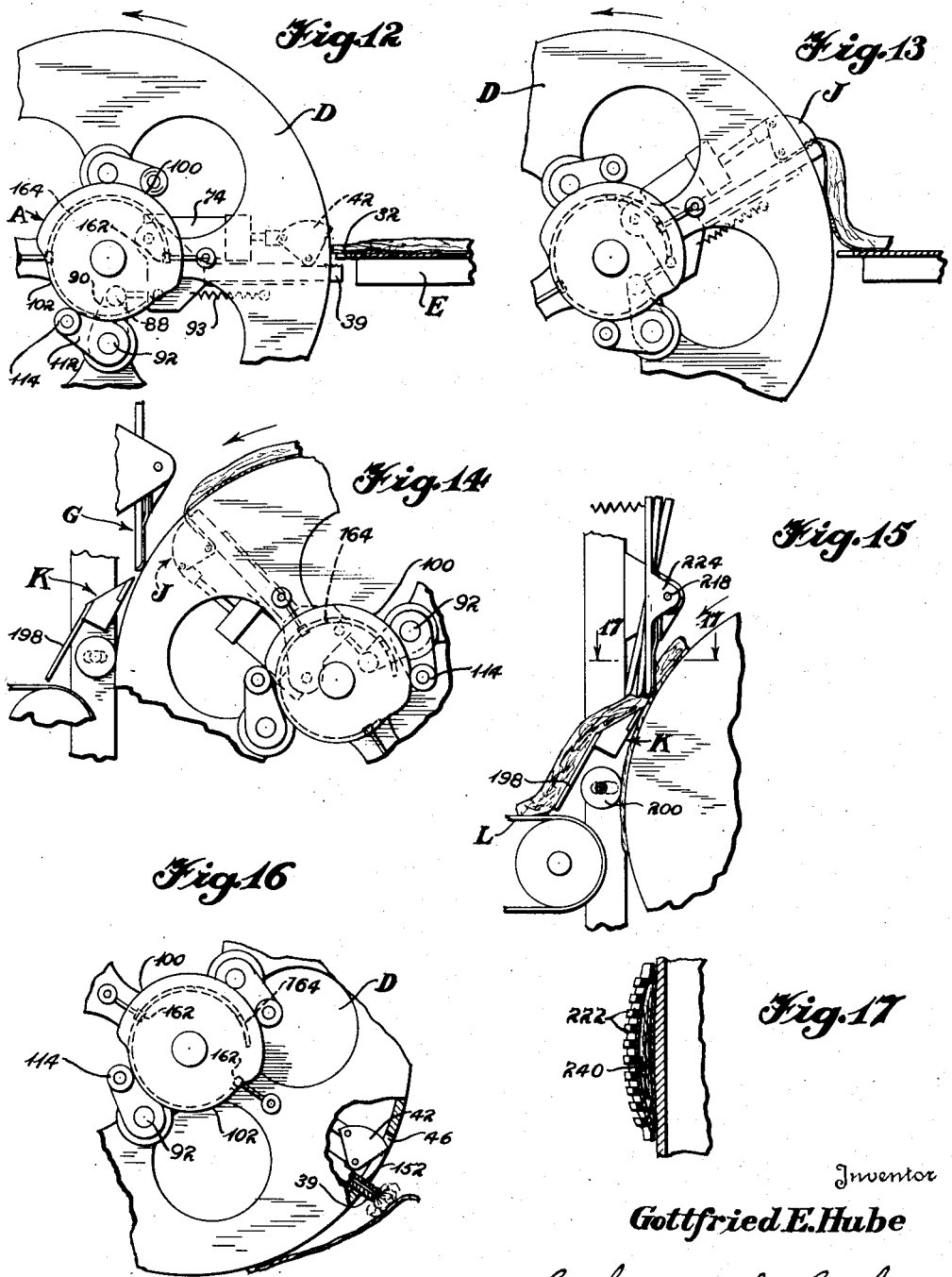

Patented Oct. 20, 1953

2,655,688

UNITED STATES PATENT OFFICE 2,655,688

APPARATUS FOR SEPARATING THE FLESH FROM THE SKIN OF FISH

Gottfried E. Hube, Bellingham, Wash., assignor, by mesne assignments, to Pacific Laboratories, Inc., Bellingham, Wash., a corporation of Washington Application August 19, 1947, Serial No. 769,496

12 Claims. (Cl. 17—2)

1

The present invention is concerned with apparatus and methods for separating the flesh from the skin of fish. The apparatus disclosed is particularly designed for use with fish boning and slitting apparatus of the type disclosed in a copending application Serial No. 756,669, filed on June 24, 1947, by Ralph M. Berglund, entitled "Apparatus and Methods for Boning and Slitting Fish," now Patent No. 2,612,652. In the application just mentioned, methods and apparatus are described wherein fish of varying size are passed through special apparatus designed to accurately remove the backbone from a whole but ventrally slit fish (the head having been previously removed, as is customary) and are simultaneously split in the dorsal-ventral plane from head to tail, whereby neatly separated fish halves are delivered in proper condition for removal of the skin, by the apparatus of the present invention.

It will be understood that the object in mind, in the development of the Berglund method and apparatus referred to, and the method and apparatus of the present invention, is to prepare fish for canning in the form of neat sections of flesh, in no way crushed or bruised, the flesh being entirely free of the skin, or any parts or bits thereof, whereby the canned fish may have a fresh and delightful flavor heretofore not possible to provide, when using methods and apparatus as were available in the prior art. In general, the object just referred to has been accomplished by treating the fish with mechanisms which are automatically accommodated to the shape of the fish, the mechanisms accommodating themselves to successive fish which may vary in size, the general design of the apparatus being such that the various operations are performed in a manner so accurate and even that there is little or no possibility of crushing or bruising the fish in any way.

The apparatus shown herein comprises a frame and a continuously rotating drum having suitable clamping means for engaging fish halves by the tail at one side of the frame, and means on the opposite side of the frame including a knife presented tangentially toward the drum which neatly severs and separates the flesh from the skin. It will be understood that the fish halves which are skinned by the present machine are of the type previously prepared by the apparatus described in the said Berglund application, and that the fish halves are carried on the rotary drum with their outer or skin sides against the face of the drum and in adhering relation thereto, whereby the knife is enabled to separate the flesh from the skin, leaving the skin adhering to the surface of the drum until it is carried to a suitable point for removal from the drum, at a station beyond that occupied by the flesh removing knife. Outstanding and inventive accomplishments reside in the manner in which the fish is engaged by the clamps in the drum, in the manner in which these clamps operate, and in the manner in which they present the fish to the knife for removal of the flesh from the skin. Similarly, inventive accomplishments reside in the manner in which the skin is subsequently removed or discharged from the periphery of the drum.

An important object of the invention is to provide a yieldable self-adjusting guiding mechanism associated with the flesh removing knife, which applies even and restraining pressure to the fish as it is presented to the knife, whereby the skin is smoothed out in unwrinkled stretched condition against and firmly held in adhering engagement with the surface of the drum as the reciprocating knife acts to neatly separate the flesh from the skin.

Another object of the invention, and one which is intimately associated with the equipment just referred to, is the provision of a drum which is slightly crowned to accommodate itself to variations in the thickness of the skin of the fish between its lateral sides and those portions of the skin adjacent the dorsal and ventral sides, whereby the skin is maintained in flattened condition against the drum at the time the straight edge of the knife operates to separate the flesh from the skin.

The refinements just referred to are of considerable importance, it having been indicated that the general purpose of the invention is to make possible delivery to the home, in cans, fish from which all flavor impairing elements have been completely eliminated.

The objectives referred to are in part accomplished by mounting the flesh removing knife on a side of the drum some distance downwardly from the top thereof, so that the fish are moved past the knife as they move downwardly with the periphery of the drum. The fish are thus swept past the knife in a positive manner. The knife is presented tangentially to the drum, with its cutting edge directed upwardly in position to engage between the skin and flesh of the fish, as the latter is swept past the knife in the downward direction. It will be understood that the fish are conveyed around the drum by suitable gripping means which grasp their tails, and which carry them tail-end first around the drum and past the skin removing knife. It will be understood that the edge of the knife is adjusted in closely spaced relation from the periphery of the drum so that it will permit passage of the skin between the knife and the drum but will not pass the flesh of the fish.

Immediately associated with and just above the cutting edge of the knife, suitable means are provided to yieldably urge the fish halves against the drum, and to support said halves against any undesirable displacement, either laterally or vertically. This mechanism is in the form of a plurality of self-adjusting yieldable fingers which are independently mounted with their free pressure applying ends presented toward the periphery of the drum. These fingers accommodate themselves to the particular size of fish which is being traversed, and after the rigidly held tail end of the fish passes under these fingers, they press against and restrain the fish to a degree just sufficient to insure that it will be evenly layed and stretched against the periphery of the drum without folds in the skin, yet without any breaks therein, whereby the knife can effect a tidy separation of the flesh from the skin, for the purposes previously referred to.

As the description herein progresses, it will be observed that there is a distinct cooperation between the yielding fingers and the knife, the former acting to smooth the skin in unwrinkled state on the drum immediately before the knife comes into operation, as well as during the operation of the knife. Also, the tail clamping mechanism bends the fish at its tail for presentation to the knife, and cooperates with the yielding fingers to keep the skin stretched on the drum while the knife is acting. The crown of the drum is also important in its cooperation during the operations under discussion, as well as the skin engaging auxiliary roller to be referred to hereinafter.

The apparatus disclosed herein is thus important in its novel combination of elements including the jaws which pull and carry the fish around the drum tail-end first, together with the yieldable fingers which exert both vertical and horizontal controlling pressures against the fish and toward the crowned drum, together with the oscillating flesh removing knife. By reason of the cooperation of the parts just referred to, every inch of the area of the skin of the fish is under control at the time the flesh is removed, whereby it is possible to deliver a product having a flavor which is not impaired by the skin, or any parts thereof.

In the drawings:

Figure 1 is a side elevational view of the apparatus,

Figure 2 is an enlarged partial side elevational and sectional axial view of the drum, showing the relative positions of the feeding and flesh removing stations, and disclosing the operation of the fish tail clamping mechanisms within the drum, Figure 3 is a top plan view of the machine, partially broken away to indicate the operation of certain of the parts within the drum, Figure 4 is an enlarged partial vertical sectional view through the drum, looking inwardly from the delivery end of the machine, the section being taken generally along the lines 4—4 of Figure 3, Figure 5 is a detailed view, showing one manner in which the flesh removing knife may be reciprocated, Figure 6 is a detailed view, partly in section, showing the mounting and operation of the flesh removing knife, Figure 7 is an enlarged detailed view of the mounting of a pressure applying roller which engages the drum just beyond the flesh removing knife to hold the skin against the periphery of the drum, taken along the line 7—7 of Fig. 2, Figure 8 is an enlarged detail view of the tail gripping mechanism, the view being taken along the line 8—8 of Figure 2, Figure 9 is a similar enlarged detailed view, being taken along the line 9—9 of Figure 2, Figures 10 and 11 are enlarged diagrammatic views illustrating one type of valve mechanism which may be utilized in opening and closing the tail gripping clamp, and in supplying air to blow the skin from the periphery of the drum after the flesh has been removed therefrom, Figures 12 through 16 are fragmentary diagrammatic views looking axially toward different parts of the periphery of the drum, and showing the travel of a fish from the delivery table where its tail is clamped, over the drum and through the flesh removing station, and thence to the terminal station of a cycle where the denuded skin is blown from the drum.

Figure 17 is a horizontal sectional view taken approximately along the line 17—17 of Figure 15, illustrating the manner in which the yielding pressure applying fingers evenly engage the non-uniform fish half to maintain the skin in intimate adhering contact with the crowned surface of the drum, Figure 18 is an enlarged front view of the yieldable guiding fingers which control the fish as it is presented to the flesh removing knife, the position from which this view is taken being indicated by the lines 18—18 of Figure 1, Figure 19 is a face view of a type of cam which may be used to operate the air valves of Figures 10 and 11 in order to properly open and close the clamp of the tail gripping mechanism, Figure 20 is a face view of a modified apparatus which may be employed to control the operation of the tail gripping mechanism. This apparatus may comprise a two-way acting cam to positively actuate the mechanism, as distinguished from the previously referred to apparatus which utilizes spring action for a part of the operation. This view is taken along the line 20—20 of Figure 21, and Figure 21 is a detailed sectional view of the two-way cam mechanism shown in Figure 20 and indicating the connection between the cam and the elements positioned within the drum.

The relative arrangement of the stations is perhaps best disclosed in Figures 1 and 2. On one side of the machine is the feeding station generally indicated in Figure 1 by the arrow extending from the letter X, and on the opposite side of the machine is the skinning station generally designated by the arrow extending from the letter Y. The drum is generally indicated as D and it is mounted in a frame for turning movement with a shaft 10 which turns in any suitable type of bearings 12 (Figure 4) carried on horizontal angle members 14 at opposite ends of the frame. The frame comprises suitable legs 16 at the four corners of the machine, which extend for a considerable distance above the horizontal angle members 14, and at their top ends they are provided with suitable cross members 18 which provide a top platform on which is mounted the main drive motor M. Through a conventional gear box 20 (Figure 1) and through the agency of a drive pulley 22 which is mounted on a shaft extending from the gear box 20, a belt 24 is driven, this belt, in turn, being connected at its lower end around a larger pulley 26 which is fixed on the shaft 10 at one end thereof as shown at Figure 3. Any suitable and conventional means may be employed to govern or adjust the speed at which the drum is turned. The arrangement is such that the motor M will drive the drum D continuously in a counter-clockwise direction, as viewed in Figure 1.

At one side of the machine, there is a delivery table E, which table may be arranged to receive the boned and slit fish halves from the machine of the Berglund application previously referred to. The conveyor C (Figure 1) may be considered as the conveyor shown in said application which delivers the fish halves from that machine, the terminal end of this conveyor being shown in Figure 1 disposed so as to deliver the fish halves onto the table E.

The inner edge 30 of the table E is disposed in very close relation to the periphery of the drum D (Figure 3). In alignment with the working or crowned area of the drum, the edge 30 of the table E is rearwardly recessed as at 32 to provide a space through which a tail gripping plate 39 protruding from the drum may sweep, in order to engage the tail of a fish which is manually presented to the drum. The tail end of the fish is positioned overlying the recess 32 in the edge of the table. By mechanism to be hereinafter described in detail, a tail gripping plate is projected from the periphery of the drum through an opening therein, just prior to the time when this opening moves upwardly past the table E. This protruding plate passes through the cut-out 32 and in cooperation with a suitable clamp it grips the tail of the fish and carries it around the drum tail-end first. The flesh removing knife K is shown in Figures 1 and 2 positioned at a point substantially 60° below the top point of rotation of the drum. The knife K has a cutting edge 34 which is reciprocated in a direction parallel to the axis of the drum. This knife edge is mounted in an adjustable manner, so that it may be presented almost tangentially to the drum and spaced from the periphery thereof a minute distance which is only slightly greater than the thickness of the skin of the fish.

Yieldable pressure guides for holding the skin against the drum and for properly presenting the flesh to the knife K, are shown at G. These guides comprise a plurality of yieldably mounted fingers which constitute a flexible barrier in the path of the fish, sections of the barrier being capable of displacement by the fish while pressing the fish back against the surface of the drum just as it is presented to the knife K. The flesh of the fish is stripped up over the knife K and dropped thereby onto the conveyor L, which is arranged to carry the flesh to the cutter or to the can filling machine. The denuded skin is carried on around on the exterior of the drum through the lower part of its cycle, and by the mechanisms which will later be described in detail, the skin is ejected or blown from the drum by a blast of air at the time the tail gripping clamp is opened in preparation for receiving another fish at the feeding station.

I have shown herein a drum of such size that two diametrically opposite clamping mechanisms may be mounted therein, so that in a lateral plane through the drum, two fish may be skinned for each rotation of the drum. However, it will be understood that the size of the drum may be altered in order to accommodate a greater number of gripping mechanisms of the type described. On the other hand, a simple machine might include only a single gripping mechanism in a lateral plane through the machine, and it will suffice to describe only one of such mechanisms, with the understanding that the design may be altered as desired, with a greater number of such mechanisms mounted for operation in proper timed relation.

In the case of the present machine, I have found it more convenient to have a pair of gripping mechanisms mounted in alignment, and spaced axially along the drum, as indicated in Figure 3. Such an arrangement is most convenient for cooperation with a boning and slitting machine of the type described in the said Berglund application, which produces two lines of fish halves carried away from that machine in two lines and thus presented in two lines to the respective gripping mechanisms of the machine of the present invention, as will be apparent from Figure 3. It will be understood that the oscillating knife K, guiding fingers G, and other associated parts, are arranged in alignment with the crowned working surfaces of both areas of the drum D, as shown in Figure 3, whereby two lines of fish may simultaneously move through the machine for treatment.

Referring to Figures 10 and 11, the tail clamping mechanism is generally designated by the letter J. It comprises a non-pivoted plate 39 constituting the outer end of a slide 40 and a fixed pivoted clamp 42. The pivoted clamp is operated by the piston of an air cylinder in a manner hereinafter described, to grip the tail of a fish as the gripping mechanism passes the feed table. That is, the plate 39 passes through the recess 32 in the feed table and as it engages the tail of the fish, suitably timed pneumatic mechanism causes the clamp 42 to pivot clockwise (Figure 10 and 11) to grip the tail against the plate 39. The engaging faces of members 42 and 39 are suitably serrated, the respective serrations being in staggered relationship with respect to one another, to insure effective gripping of the tail of the fish.

It will be understood that the gripping members 39 and 42, as well as the associated pneumatic cylinder for operating the clamp 42, are arranged as a unitary assembly capable of substantially radial movements with respect to the axis of the drum. The face of the drum in radial alignment with each assembly is provided with openings 46 therein (Figures 2, 3 and 16), and as the assembly approaches the feed table E, it is moved outwardly to project the plate 39 beyond the surface of the drum in such position as to pass through the slot 32 in the edge of the feed table to engage and pick up the tail of a fish which will have been placed in proper position. At the time that plate 39 engages the tail, clamp 42 is closed by the timed action of the pneumatic mechanism, whereupon the fish is carried upwardly around the drum tail end first. Shortly after the opening 46 passes beyond the slot 32 of the feed table, mechanical mechanisms hereinafter described cause the gripping assembly to be retracted radially inwardly in order to leave the surface of the drum clear, so that the fish may be carried with its tail gripped within the drum past the guides G, the skinning knife K, and the other elements present at the skinning station. Thereafter, and as the opening 46 again approaches the feed table, the mechanisms referred to cause the gripping assembly to again be projected outwardly so that the plate 39 will be in position to engage the next fish in the line.

The gripping assembly is supported on a fixed substantially radially extending saddle plate 50 (Figure 4), this plate being held in fixed position in a radial plane extending toward the lower part of the opening 46 by means of a web 52 (Figures 2 and 4) which is flanged as at 56 and bolted to a plate 58 which is, in turn, welded (at 59) against the inner face of the drum, as shown in Figure 2. The saddle plate 50 together with the drum face opening 46 defines a radial pocket extending inwardly from the drum surface. The inward continuation of plate 39 constitutes a slide 40 which is capable of radial reciprocation on the saddle plate 50, this slide extending inwardly almost to the center of the drum and having a central longitudinal slot 60 cut in its lower face which fits over and is guided by the supporting plate 50 (Figure 8). Suitable opposite longitudinal retaining plates 62 are bolted to the lower face of the slide 40 and they extend inwardly beneath and in engagement with the lower face of the supporting plate 50 in order to hold the slide on the supporting plate. Near the forward end of the slide 40, and just inwardly of the tail engaging teeth thereon, an inverted U-shaped frame 64 is secured (Figures 4 and 9), and clamp 42 is pivoted adjacent its lower end, as at 66 (Figure 2) between the opposite legs of the frame 64. Each side of the clamp 42 is in the form of a segment of a circle, and at its inner corner it is pivoted, as at 68, to the forward end 70 of a piston rod 72 which extends from the outer end of a cylinder 74. It will be understood that the air cylinder 74 is carried bodily on slide 40, being pivoted, as at 76, between the upper ears 78 of a pair of brackets which are bolted to opposite sides of the slide as shown particularly in Figure 2. The brackets just mentioned have opposite lower ears 80, and between these ears a supporting boss 82 is mounted for turning movement on the pivot 84. This boss serves as the pivotal connection with a rod 86 which, in turn, is pivoted as at 88 to the outer end of a rocker lever 90 which is keyed to a rock shaft 92 that extends outwardly through the end of the drum. The rock shaft is operated by the main cam assembly of the machine to actuate the gripping assemblies in their outward and inward movements at the proper time.

As shown in Figures 2 and 8, the connecting rod 86 is attached to the pivoted boss 82 in an adjustable manner by means of nuts 90' threaded on the connecting rod on opposite sides of said boss. Continuing with Figure 2, there are tension springs 93 connected at their opposite ends to the lower bracket ear 80 and to the fixed supporting web 52, respectively, the action of said springs being to normally bias the gripping assembly, comprising the slide 40, pivoted clamp 42 and cylinder 74, toward its outer position, whereas the action of the rock shaft 92 and the rocking lever 90 is to draw the assembly inwardly at proper times after the tail of a fish has been clamped, and during the period when this fish is being carried past the mechanisms which assist in removing the flesh from the skin of the fish. It will be understood that any suitable mechanism may be provided to rock the shaft 92 at the proper time to accomplish the above purposes, and it will further be understood that any suitable cooperating means may be designed and provided, and coordinated in timed relation, to operate the pneumatic system which operates the clamp 42. This means should close clamp 42 at the proper time when the gripping assembly is moved outwardly, maintain clamp 42 in closed position throughout the operation of the devices which remove the flesh from the skin of the fish, and then at the proper coordinated time, release the clamp 42 in order that the skin of the fish may be discharged from the drum and the gripping mechanism thus prepared to receive the tail of the next fish to be skinned, all as hereinafter described.

The main cam A of the machine is conveniently mounted beyond the exterior of the drum at the end thereof opposite the pulley or other means which applies power to turn the drum. This cam has a peripheral high portion 100 and a low portion 102. The high portion governs that part of the cycle immediately before, through, and beyond the skinning station. The cam A is maintained in fixed (but adjustable) position with respect to the turning shaft of the drum, being secured to a retaining plate 106 which is journalled around the main drum shaft, the retaining plate being, in turn, rigidly connected with the frame of the machine as at 108 (Figure 4). The main cam is secured to plate 106 by set screws as shown in Fig. 4, these screws extending through elongated circular slots 165 in the cam plate, where by the cam may be adjusted to regulate the timing of the machine.

The rock shaft 92 extends beyond the end of the drum, and is journalled in the end wall as at 110 (Figure 4). At its extending end, it carries a lever 112 rigidly attached thereto (Figures 1 and 3), this lever carrying a cam roller or follower 114 which is maintained in suitable contact with the surfaces 100 and 102 of the main cam at all times. For example, the action of the spring 93 (Figure 2) should be strong enough to urge the cam roller 114 (Figure 1) against the main cam surfaces at all times.

It will be apparent from the above description that those skilled in the art may construct properly timed cam mechanisms as described, wherein, and referring to Figure 1, the gripping assembly will be retracted during that part of the cycle of rotation of the drum when the cam roller 114 is on the high surface 100 of the main cam (when the opening 46 has moved from the feed table and until it has passed beyond the skinning station), and wherein said assembly will be moved outwardly after the opening 46 has traversed the skinning station and until it has passed beyond the feeding station, by the contact of cam roller 114 with the low surface 102 of the main cam.

As stated before, the gripping assembly includes a pneumatic cylinder 74 and associated system, which is operated to pivot the clamp 42 into closing relationship with the plate 39 as the tail of a fish is picked up at the feeding station. This pneumatic system is operable to keep these parts in gripping relationship throughout the major portion of the cycle of the drum, the denuded skin being released as the opening 46 in the drum again approaches the feeding table. Referring to Figures 10 and 11, there is an air piston 120 which is mounted for reciprocation in the cylinder 74. This piston is connected with the rod 72, previously mentioned, to rock the clamp 42 around its pivot 66. The piston 120 is controlled by any suitable type of valve V, which comprises a housing 122 which is attached in any suitable manner to the end face of the drum. The position of the mounting for the valves V in the end drum is shown in Figure 3. In the arrangement shown, there are two of these valves, one for each pair of axially aligned gripping assemblies, and each may be positioned approximately mid-way between the opposite rock shafts 92.

Leading into the housing of each valve is a suitable air inlet pipe 130, this pipe being connected with a bore 132 extending longitudinally through the main drum shaft from the outer end thereof (Figure 4), the bore being in communication with a pipe or tube 134 leading from any source of air under pressure, the connection being made by an appropriate fitting 136 on the end of the drum shaft. Leading from the main valve housing, are a pair of high pressure flexible pipes 140 and 142 communicating, respectively, with the interior of the cylinder 74 at the outer and inner ends of the latter, i. e., so that the pressure of air supplied through said pipes will act on opposite sides of the piston. There is a suitable valve member 144 mounted for reciprocating movements in a bore 146 within the valve housing, this valve member having suitable spaced abutments thereon, as is well known in the art, to control the admission of air to and exhaust of air from the opposite ends of the cylinder 74 as illustrated in the drawings. When the valve member is moved inwardly in the bore 146, as shown in Figure 10, the abutments thereon provide for the supply of high pressure air from pipe 130 to pipe 142, thus moving the piston 120 outwardly to close clamp 42 against plate 39. At the same time, the action of the valve is to permit atmospheric discharge from the outer end of the cylinder 74, via pipe 140 and outwardly from the valve housing through the port 148.

When the valve member 144 is moved to the left, as in Figure 11, high pressure air from inlet pipe 130 will pass through pipe 140 to the right-hand end of cylinder 74, and will force the piston 120 inwardly, thus opening the clamp 42. Obviously, the construction of the control valve could be arranged to permit exhaust from the inner end of the cylinder 74 on this stroke of the piston, by effecting suitable connections in the valve housing with respect to the pipe 142. For example, air could exhaust outwardly through the right-hand end of the housing.

As has been indicated above, it is desirable to provide pneumatic means for blowing the denuded skin with violence from the surface of the drum at some stage prior to the return of the opening 46 to the feed table E. Any suitable type of pneumatic control may be provided for this purpose, and as one example thereof, I have used the exhaust from the cylinder 74 on the clamp opening stroke of the piston 120 to provide this blast. As shown in Figures 10 and 11, a pipe 150 may be connected into the inner end of the valve housing 122, and this air pipe is arranged to join with a longitudinal blast passage 152 which extends outwardly through and to the end of the fixed plate 39 (Figure 11). The end of the blast port 152 is also shown in Figure 4. With this arrangement, and when the opening 46 in the drum is again approaching the feed table, and at the time when the clamp 42 is pivoted counterclockwise to release the tail of the fish, the outward movement of the control valve member opens communication between pipe 142 and pipe 150 to deliver a blast outwardly through the passage 152 and this blast serves to forcibly remove the skin from the drum and from over the end of the plate 39.

While I have disclosed such an air blast delivered through the end of the plate 39, it will be understood that various other means may be employed to deliver the blast of air through the surface of the drum at one or more points adjacent to and rearwardly of the opening 46 in order to remove the skin. Furthermore, other means for controlling the delivery of the air blast may be provided, either coordinated with the pneumatic system which operates the clamp 42, or a separate piping system may be provided so that air from a separate source may be provided to remove the skin.

Referring to Figure 10, the pneumatic control valve member 144 is normally urged outwardly by a spring 156 which is held between the end wall of the drum and the connecting eye of a radially inwardly directed pin 160 connected to the outer end of the valve member. This pin carries a cam roller 162 which rides against cam surfaces on the inner face of the main cam A, in order to operate the pneumatic control valve as perhaps best shown in Figures 10, 11 and 19.

This auxiliary cam has a high portion 164 interrupted by low portion 166. The high portion of this cam extends throughout the major part of the circular length thereof, and is so designed in timed relation with the action of the cam surfaces 100 and 102 to cause the pneumatic valve member to be moved and held inwardly as in Figure 10 during the period when the gripping assembly is retracted inwardly while the fish is being carried past the skinning station and up to the point where the assembly is again moved outwardly to release the tail of the fish.

The timed operations as previously referred to are shown successively in Figure 12 through 16. In Figure 12, the opening 46 is shown just as it approaches the feed table E, and it will be observed that the main cam roller 114 is on the low surface 102 of the main cam A, whereby spring 93 acts to rock shaft 92 in order to displace the jaw assembly outwardly so that the plate 39 protrudes beyond the periphery of the drum D. The end of this jaw passes through the recess 32 in the edge of the feed table and engages the tail end of the fish as shown. Just at this particular time, or shortly thereafter, the pneumatic valve operating cam 162 rides up on the high surface 164 of the valve operating cam on the inner face of the main cam member A, whereby the pneumatic system operates to close the clamp 42 against the plate 39 as in Figure 10. This condition of the parts is illustrated in Figure 13.

At any appropriate part of the cycle between the position of the drum as shown in Figure 13 and that shown in Figure 14, the main cam roller 114 rides up on the high part 100 of the main cam, thus rocking shaft 92 in a counterclockwise direction, resulting in the inward movement of the entire gripping assembly. Thus, the mechanical parts will be housed within the drum as the fish approaches the positioning guides G and the skinning knife K. That portion of the flesh of the fish adjacent the tail is bent inwardly of the drum through about 90° and thus will be stretched and conditioned for presentation to the cutting edge of the reciprocating knife, which can thereby effect a neat separation of the flesh from the skin, as illustrated in Figure 15. Continued counterclockwise movement of the drum D carries the main cam roller 114 again to the low part 162 of the main cam, whereupon the action of spring 93 again moves the gripping assembly outwardly as in Figure 16, and at the same time; the pneumatic valve cam 162 leaves the high part 164 of its track, thus pivoting clamp 42 away from member 139 as illustrated both in Figures 16 and 11. At this time, exhaust air may be permitted to discharge through the blast passage 152 in the jaw member 39 to blow the denuded skin off of the drum as illustrated in Figure 16. It will be apparent that the timing and arrangement of the parts are such that the above operations may be continuously repeated to skin successive fish presented to the jaws on the feed table E.

The skinning knife assembly is shown in some detail in Figures 5 and 6. In general, this mechanism comprises a knife carrier or block 170 having a knife member 172 removably mounted therein. The knife member has a cutting edge 34 as previously referred to. At its opposite ends, the block 170 is adjustably pinned as at 174 to slideable holding members 176, the latter members being mounted for limited reciprocating movement on a slide 178 fixed to a bracket 180 which, in turn, is integrally connected to extend inwardly from the frame members as shown in Figure 6. Suitable straps 180 and 182 extend inwardly from at least one of the blocks 176, whereby the cutting edge of the knife, as presented toward the drum, may be adjusted around the pivots 174 by the adjusting screws 184. The members 176 are constructed to engage around and beneath the slide 178 by suitable retaining plates, as shown in Figure 2.

At one end of the machine, there is a pitman 188 pivoted to one of the members 176. The outer end of this pitman is eccentrically connected to a disc 189 which is fixed on a shaft 190 which, in turn, carries a pulley 191 driven by a belt 192 from the main motor M. Belt 192 is driven from a pulley 194 mounted on a shaft extending from gear box 196, which, in turn, is operated by motor M.

With the above construction, the cutting knife may be properly adjusted with respect to the drum. As a fish is carried past the knife by rotation of the drum and with the tail clamping means retracted, the knife will cleanly separate the flesh of the fish from the skin, the flesh passing over the knife as shown in Fig. 15, being guided by a baffle plate 198 secured to the body portion 170 of the knife. Plate 198 directs the separated flesh of the fish downwardly onto the conveyor L.

In order to further facilitate the separation of flesh and skin, without cutting or tearing the latter from adhering relationship on the surface of the drum, a roller 200 may be provided to engage the denuded skin just beyond the knife K. This roller is positioned so that its surface contacts that of the moving drum, and it is preferably positively driven in a direction opposite to that of the drum and at the same surface speed as that of the drum. This roller is shown mounted in the frame on a shaft 202 having an end collar portion 204 (Figure 7) held in guide openings 206 in suitable strap members 208 secured to the frame of the machine, there being springs 210 at opposite ends of the shaft 202 suitably housed to exert appropriate yieldable and adjustable pressure of the roller 200 against the surface of the drum.

The function of the roller 200 is to assist in evenly ironing out and retaining the denuded flesh of the fish against the rotating drum and to prevent it from being cut or torn and carried away with the flesh of the fish. The action of this roller is to exert some forward tension on the skin, acting with the drum to pull the skin from the flesh of the fish, the flesh being held against downward movement by the cutting edge of the skinning knife K. While the roller 200 may be positively driven in coordinated relation with the speed of the main drum, by any conventional driving means (not shown) or at any regulated speed with respect to the speed of turning of the drum, it may be yieldably mounted as an idler to be driven by the main drum while applying pressure against the denuded skin and exerting a mild pulling tension thereon. This drum facilitates the clean removal of the flesh from the skin to a substantial degree.

The guiding fingers G are of a type somewhat similar to those described in my previously filed application Serial No. 655,647, filed March 20, 1946, now Patent 2,601,292, dated June 24, 1952, although they are of increased effectiveness as they act in combination with the knife and tail gripping clamps, as well as with the crowned drum. Referring to Figures 1, 2 and 18, there are spaced brackets 216 on opposite ends of the frame and extending inwardly toward the drum above the skinning knife K. Mounted between these brackets is a bearing rod 218, which provides a pivot for a plurality of guiding fingers, said fingers having upper ends 220 above the pivot and lower ends 222 below the pivot. These fingers are positioned outwardly of the supporting rod 218 (Figure 2) but they have forwardly extending ears 224 with apertures therein to embrace the rod 218. In order to provide for ease of independent movement of the respective guiding fingers around the pivot rod 218, intermediate discs 226 may be provided on said rod between the fingers.

The upper ends 220 of said fingers are individually urged toward a backing plate 230 which extends across the frame of the machine spaced from the fingers, said plate being carried by rearwardly extending brackets 232 on the frame. The individual connection of each finger is by means of a spring 234 which may be adjusted in tension by a screw 236 (Figure 2) which is threaded through the backing plate 230. The lower portions 222 of the fingers terminate in outwardly curved pressure applying ends 238, and these lower portions are covered by a flexible taut rubber apron 240 of neoprene or the like which is suspended and held in smooth condition in front of the fingers by brackets 242 which are likewise pivoted on the rod 218 adjacent opposite ends thereof. The neoprene or rubber apron is held in somewhat stretched condition on a three way frame, as best shown in Figures 2 and 18, said frame comprising top and side plates with the rubber stretched therebetween. Thus a more even yielding surface is presented to engage the fish.

It will be apparent from the above construction that as a fish is carried downwardly toward the skinning knife, tail-end first, it passes through and under the yieldable guiding fingers, and they serve to smooth and press the fish at all points against the drum. Particularly, they smooth out the skin of the fish in adhering relation against the crowned surface of the drum. The independent mounting of these fingers permits them to assume the irregular shape of the fish as it passes the fingers, so that the aligning pressure action of these fingers is uniform throughout the contour of the fish, the fingers conforming themselves to the shape of the fish. It will be obvious that these yielding fingers serve to restrain the fish against lateral displacement on the drum as it is presented to the knife, and they also restrain the trailing portion of the fish against sagging or bunching by gravity, which might cause creases or distortions in the fish and resulting disruption or tearing of the skin by the knife.

The action of the fingers is further illustrated in Figure 17, and it will be noted that the cylindrical exterior surface 250 of the drum is slightly and gradually crowned as at 252, it having been observed that the skin of a fish is slightly thicker at the dorsal and ventral sides, as compared with the middle portion of the body of the fish. By this crowned construction, the line of cleavage between the flesh and skin of the fish is straightened out and evenly presented to the straight cutting edge of the knife, whereby a clean and neat separation of the flesh from the skin is effected.

Figures 20 and 21 are views which further illustrate how those skilled in the art may construct equipment for carrying out the invention. In this view, a modified main cam A' is shown, comprising a plate having a conventional closed cam track 258 in its face presented to the drum. This cam track is the same in design and timing as that previously described, and has an outer wall whereby cam rollers 260 and 260' for the respective rock shafts 92 are positively operated to rock shaft 92 in both directions, in which case spring 93 may not be required. This main cam is provided with an auxiliary air valve operating cam 264, 265 which may be identical with cam 164, 166 previously described in design, timing and functions.

It will be apparent from the above description that my apparatus will control the condition of the skin of the fish in a manner not possible with prior art apparatus which may bear a general similarity to my equipment. While rotating drums and flesh-removing knives have been used in association with tail-gripping mechanisms, the results of the present invention were not attained with such apparatus because it lacked the features of control of the fish and of its skin, as described herein.

The position of the knife and associated guiding fingers is important. I rely not only on gravity to hold the skin side of the fish firmly against the crowned surface of the drum, but also upon the fingers which exert force against all portions of the fish. These forces maintain the fish in position against both vertical and horizontal displacement, and they adjust themselves to the contour of the fish vertically as well as horizontally. I am aware of the fact that belts and other means of pressure have been previously suggested, but all such methods permitted the flesh of the fish to "bunch" and the skin to wrinkle, and the edges of the fish were most often forced toward the center instead of being spread and stretched outwardly into smooth condition.

The position of the knife in my apparatus is such as to utilize the force of gravity to assist in separating the flesh from the skin. Also, the momentum of the fish in its path of travel will assist in the separation when the knife releases the flesh from the skin permitting the former to depart tangentially from the drum.

Obviously, there may be changes in the precise structure which I have used herein for purposes of illustration. For example, the mechanical mechanisms which I have disclosed, including the cams and associated parts, may be replaced by other similar and equivalent mechanisms. While I have shown a preferred method for operating the fish-tail clamp, various equivalents might be substituted such as an electrical system employing solenoids in place of the preferred air cylinders.

Many advantages are inherent in the equipment described herein and not found in the prior art. For example, no moving parts are required on the feed table, nor are special mechanisms needed to feed the fish to the drum. It is unnecessary to stop the drum to feed a fish thereto. Appliances such as needles and the like which puncture the skin and the flesh are not utilized, and this assists materially to insure a clean separation of the flesh from the fish. At no point is the weight of the fish dragged by the skin so as to disrupt it. The tail gripping mechanism does not employ pairs of jaws which are projected from the drum. The single element which protrudes from the drum is the lower clamping plate, with its clamping surface in a horizontal plane. The pivoted clamp is maintained within the drum and out of the way to facilitate feeding the fish to the drum, the pivoted clamp closing to properly clasp the tail. The retractable tail gripping mechanism insures that the skin is held close against the drum, and the guiding fingers act from the tail toward the head of the fish to smooth the skin against the drum. These fingers act longitudinally of the fish and laterally thereof, to press and smooth the skin against the crowned surface of the drum. A stretching action is effected from the tail outwardly in a fan-like manner to stretch the fish smoothly over the crowned drum, and immediately thereafter the knife severs the flesh from the skin at the tail end, continuing the separation throughout the body of the fish.

I claim:

1. Apparatus for removing the flesh from the skin of fish halves comprising a frame having feeding and skinning stations on opposite sides of the frame and a drum with a curved outer surface mounted for rotation thereon between said stations, said drum having means for gripping the tail end of a fish half when same is received at said feeding station and for carrying it upwardly and thence downwardly on the drum past said skinning station with the skin side of the fish presented toward said curved surface, a skinning knife mounted on said frame at said skinning station and in the downward path of movement of the fish on said drum, said knife having an edge positioned to separate the flesh from the skin of the fish when the latter is moved past said knife, and guiding mechanism for the fish positioned on said frame in the downward path of movement of the fish previous to its arrival at the skinning station comprising a plurality of pivoted fingers positioned laterally across the path of movement of the fish and having free ends fixed against movement with said drum which engage and apply a yielding and restraining pressure to the fish immediately before it is acted on by said knife, the restraining action of said free ends of said fingers serving to prevent downward relative movement of portions of the fish with respect to the surface of said drum, whereby to stretch the skin of the fish in unwrinkled state on the surface of said drum to facilitate separation of the flesh therefrom by said knife, certain of said fingers having free ends positioned to engage the sides of the fish to prevent lateral displacement of the fish on said drum as it approaches engagement with said knife.

2. A construction in accordance with claim 1 wherein said guiding mechanism includes a sheet of flexible material covering the engaging ends of said fingers to make the application of pressure to the fish more uniform.

3. Apparatus for removing the flesh from the skin of fish halves, comprising a frame and a drum having a curved outer surface mounted for rotation thereon, said drum having means for gripping the tail end of a fish half and for carrying it around the drum with the skin side of the fish presented toward said curved surface, a skinning knife mounted on said frame having an edge positioned to separate the flesh from the skin of the fish when the latter is moved past said knife, and guiding mechanism for the fish mounted in fixed position on said frame in the path of movement of the fish, comprising a group of independently mounted fingers having free ends fixed against movement with said drum and positioned to engage and apply yielding and restraining pressure to the fish immediately before and while it is being acted on by said knife, said group comprising central fingers positioned to engage the thicker portion of the fish and outer fingers on each side of said central fingers positioned to engage the thinner portions of the fish to restrain it against displacement laterally of its path of movement, the restraining action of said fingers causing the skin of the fish to be stretched in unwrinkled condition against said drum as said knife operates to separate the flesh therefrom.

4. Apparatus for removing the flesh from the skin of fish halves, comprising a frame and a drum having a curved outer surface mounted for rotation thereon, said drum having means for gripping the tail end of a fish half and for carrying it around the drum with the skin side of the fish presented toward said curved surface, a skinning knife mounted on said frame having an edge positioned to separate the flesh from the skin of the fish when the latter is moved past said knife, and guiding mechanism for the fish half mounted in fixed position on said frame in the path of movement of the fish half, comprising a plurality of fingers mounted on said frame along the length of said drum having free ends positioned to engage the fish half at localized points immediately adjacent to said knife to apply restraining pressure to successive longitudinal portions of the fish half as said portions approach said knife, and immediately before and while the fish half is being acted on by said knife, the restraining action of said fingers causing the skin of the fish to be stretched in unwrinkled condition against said drum as said knife operates to separate the flesh therefrom.

5. A construction in accordance with claim 4, including a roller mounted on said frame in contact with said drum in the path of movement of the fish half and beyond said knife to apply tension to the skin of the fish half.

6. A construction in accordance with claim 4, wherein each of said fingers is provided with adjustable yielding means to urge their free ends toward said drum.

7. Apparatus for removing the flesh from skin of fish halves, comprising a frame and a drum having a curved outer surface mounted for rotation thereon, said drum having means for gripping the tail end of a fish half and for carrying it around the drum with the skin side of the fish presented toward said curved surface, a skinning knife mounted on said frame having an edge positioned to separate the flesh from the skin of the fish when the latter is moved past said knife, and means for stretching and smoothing the skin of the fish against the outer surface of said drum, said means comprising a flexible sheet mounted in fixed position on said frame adjacent said knife and having a front face positioned to engage the fish immediately before and while it is being acted on by said knife and as said drum carries the fish past said sheet, said means further comprising a plurality of fingers mounted on said frame and having yieldably mounted ends which act against the rear face of said sheet to apply a yielding and restraining pressure to the fish, the restraining action of said sheet against the fish causing the skin thereof to be stretched in unwrinkled condition against said drum as said knife operates to separate the flesh therefrom.

8. Apparatus for removing the flesh from the skin of fish halves comprising a frame, a drum having a cylindrical outer surface rotatably mounted on said frame, a radial pocket in the drum surface, means in said pocket for gripping the tail end of a fish, a skinning knife mounted on said frame substantially tangentially to the drum surface, and guiding mechanism mounted on said frame adjacent the drum surface, said guiding mechanism including a plurality of laterally spaced fingers pivotal about an axis parallel to the drum axis, said fingers having free ends disposed substantially tangentially to the drum surface and resiliently urged theretoward, said free ends being adjacent and facing the edge of said knife.

9. Apparatus according to claim 8, wherein said gripping means is radially projectable and retractable in said pocket.

10. Apparatus according to claim 8, including means in said drum to automatically project and operate said gripping means at a point spaced from said guiding mechanism, and means in said drum to automatically retract said gripping means into said pocket before it reaches said guiding mechanism.

11. Apparatus according to claim 8, including air blast means in said drum adapted to dislodge a skin therefrom after the flesh has been removed from the skin.

12. Apparatus for removing the flesh from the skin of fish halves comprising a frame having feeding and skinning stations on opposite sides of the frame and a drum with a curved outer surface mounted for rotation thereon between said stations, said drum having means for gripping the tail end of a fish half when same is received at said feeding station and for carrying it upwardly and thence downwardly on the drum past said skinning station with the skin side of the fish represented toward said curved surface, a skinning knife mounted on said frame at said skinning station and in the downward path of movement of the fish on said drum, said knife having an edge positioned to separate the flesh from the skin of the fish when the latter is moved past said knife, and guiding mechanism for the fish positioned on said frame in the downward path of movement of the fish previous to its arrival at the skinning station comprising a plurality of fingers fixed against movement with said drum, said fingers having free ends which engage and apply yielding and restraining pressure to the fish as it is carried past said fingers and immediately before and while it is being acted on by said knife, the restraining action of said fingers serving to prevent collapsing action of the fish on the drum under the action of gravity and causing the skin of the fish to be stretched in unwrinkled condition against said drum as said knife operates to separate the flesh therefrom.

GOTTFRIED E. HUBE.

References Cited in the file of this patent

UNITED STATES PATENTS

| Number | Name | Date |
|---|---|---|
| 1,291,173 | Salmon | Jan. 14, 1919 |
| 1,596,649 | Barry | Aug. 17, 1926 |
| 1,867,133 | Bisset | July 12, 1932 |
| 1,936,688 | Rieske et al. | Nov. 28, 1933 |
| 1,993,899 | Rieske | Mar. 12, 1935 |
| 2,173,336 | Lamere et al. | Sept. 19, 1939 |
| 2,178,787 | Gorton, Jr. | Nov. 7, 1939 |
| 2,203,566 | Gibbs | June 4, 1940 |
| 2,215,114 | Baader et al. | Sept. 17, 1940 |
| 2,234,658 | Smith | Mar. 11, 1941 |
| 2,311,176 | Hutton | Feb. 16, 1943 |
| 2,455,831 | Townsend | Dec. 7, 1948 |